No. 717,351. Patented Dec. 30, 1902.
C. H. CLARE.
STORAGE BATTERY.
(Application filed Mar. 1, 1902.)
(No Model.)
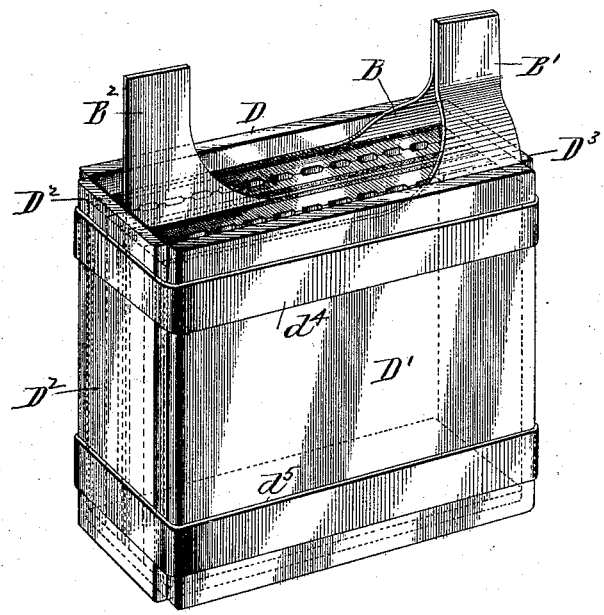
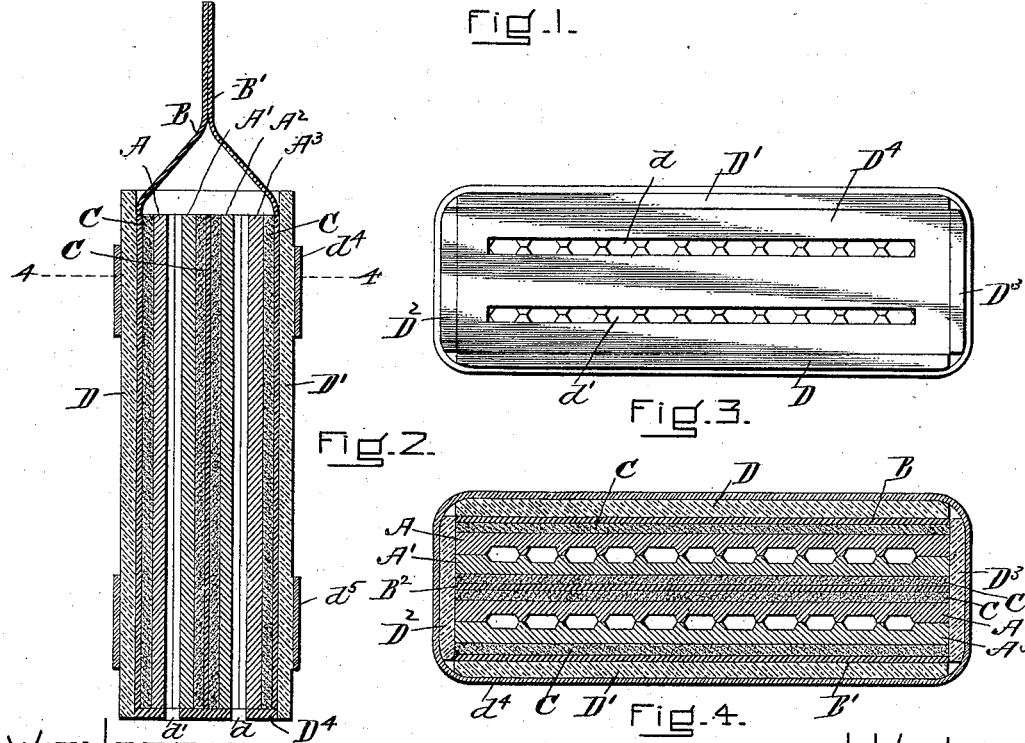
WITNESSES:
INVENTOR:

UNITED STATES PATENT OFFICE.

CHARLES H. CLARE, OF QUINCY, MASSACHUSETTS.

STORAGE BATTERY.

SPECIFICATION forming part of Letters Patent No. 717,351, dated December 30, 1902.

Application filed March 1, 1902. Serial No. 96,222. (No model.)

*To all whom it may concern:*

Be it known that I, CHARLES H. CLARE, a citizen of the United States, and a resident of Quincy, in the county of Norfolk and State of Massachusetts, have invented a new and useful Improvement in Storage or Secondary Batteries, of which the following is a full, clear, and exact description, reference being had to the accompanying drawings, forming a part of this specification, in explaining its nature.

The invention is an improvement upon that described in the patent to George E. Hatch, assignor, No. 585,472, dated June 29, 1897, for secondary battery.

The invention is an improvement upon the class of storage or secondary batteries employing a number of loose independent porous plates carrying upon their faces the active material and having interposed between them plates of lead and which plates and active material are multiplied to any desired extent and are contained in an exciting fluid held in a suitable vessel. A battery so constructed has been found to be efficient, especially when first used. It had, however, a serious defect in that there was no provision whereby the active material could be held or retained in its original position between the loose plates, the chambers or cells containing it being open at their bottom and sides and permitting its gradual escape from between the plates into the vessel holding them and away from the lead plates. My invention seeks to overcome this defect by so combining the loose porous plates that the active material upon their surfaces may be continuously held upon them and prevented from escaping from between the plates either laterally or downwardly, and to accomplish this end I provide each group of porous plates with exterior means for closing their joints when they are together, the said means consisting of plates of glass or gutta-percha or other insulating material of suitable shape and bound together about the porous plates, but in a manner not to interfere with the circulation of the liquid between groups of them.

I will now describe the invention in conjunction with the drawings forming a part of this specification, wherein—

Figure 1 is a view in perspective of a group of porous plates comprising what may be called a "unit." Fig. 2 is a view in vertical section thereof. Fig. 3 is a view in plan thereof inverted. Fig. 4 is a view in horizontal section upon the dotted line 4 4 of Fig. 2.

In the drawings the unit is represented as having the four porous plates $A$ $A'$ $A^2$ $A^3$ and the lead plates $B$ $B'$ $B^2$. The porous plates have cellular surfaces upon one face and ridges forming channels and abutments upon the other face. The plates $A$ $A^3$ have active material $C$ upon their outer surfaces only, and the lead plates $B$ $B'$ are in contact therewith, being held against it and the plates by the outer insulating-plates $D$ $D'$. The porous plates $A'$ $A^2$ have the active material $C$ on each of their opposing surfaces, the lead plate $B^2$ being between them and the porous plates serving to hold and press the active material against the plate—one from one side and the other from the other side. The outer surfaces of these inner porous plates $A'$ $A^2$ and the inner surfaces of the outer porous plates $A$ $A^3$ do not bear active material and are open throughout their length and at their bottoms for the purpose of providing for a circulation of the exciting liquid by the ends of the porous plates. The joints at the ends of the porous plates, formed by the exposed edges of the lead plates, and covered by the independent insulating-plates $D^2$ $D^3$, and the joints at the bottom of these porous plates, similarly formed by the lead plates and porous plates, are covered by the independent insulating-plate $D^4$, which has the long slots $d$ $d'$ corresponding in location with the passages $d^2$ $d^3$ between the plate $A$ and the plate $A'$ and the plate $A^2$ and the plate $A^3$. This latter plate may be attached in any desired way to the under surfaces of the porous plates. The side plates $D$ $D'$ $D^2$ $D^3$ are bound together in place by any suitable binders $d^4$ $d^5$. These joint-sealing plates may be of any suitable insulating material.

The porous and lead plates may have any other desired arrangement with respect to each other, as the invention does not lie in the arrangement described, but in the means employed for making a battery of this class more effective by preventing the escape of the active material from between the loose porous plates by means of independent insulating joint-sealing plates, which seal the joints which would otherwise exist between the lead plates and the porous plates at the bottom and ends of both.

The porous plates of the battery are made of an earthenware, which is very fragile, and the insulating-plates, which inclose them upon their outer edges and surfaces, are of a stronger material much less apt to fracture or chip, and they serve to protect the porous plates as well as to insulate the cells. It will be understood that the bottom insulating-plate $D^4$ forms the bottom to the spaces between the plates which receive the active material and the lead plates and that the active material and lead plates extend to the insulating-bottom.

Having thus fully described my invention, I claim and desire to secure by Letters Patent of the United States—

1. The improvement in secondary or storage batteries herein described, the same comprising one or more units each consisting of independent porous plates bearing active material, lead plates held in contact with said active material, passages extending between the porous plates, and means for holding the porous plates against each other and the lead plates comprising porous plates protecting and insulating-plates applied to the outer surfaces of the porous plates in a manner to prevent the escape of the active material laterally or downwardly therefrom and also forming a protection for them.

2. In a secondary or storage battery, the combination of a number of independent porous plates, interposed lead plates and active material, and exterior insulating-plates to cover the end joints and bottom joints between said plates whereby the active material is held from escape from between the plates.

CHARLES H. CLARE.

In presence of—
J. M. DOLON,
SAUL SIPPERSTEIN.